No. 822,172. PATENTED MAY 29, 1906.
S. B. WELCOME.
INTERNAL COMBUSTION ENGINE.
APPLICATION FILED APR. 24, 1905.
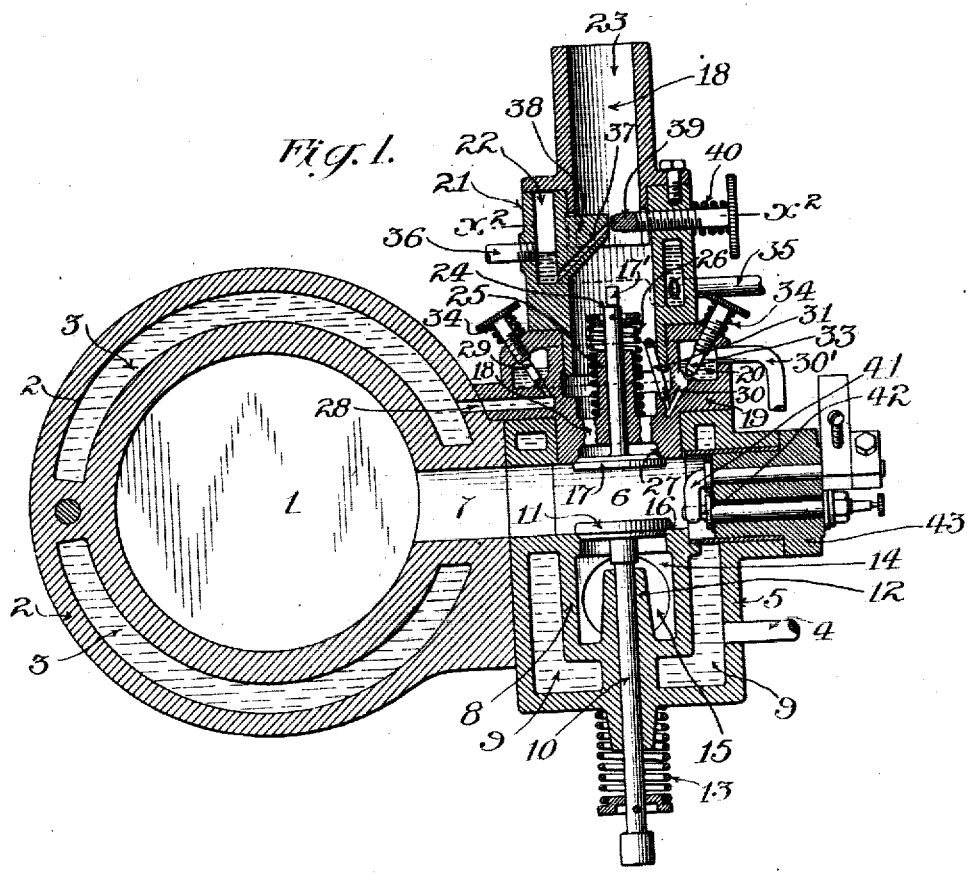
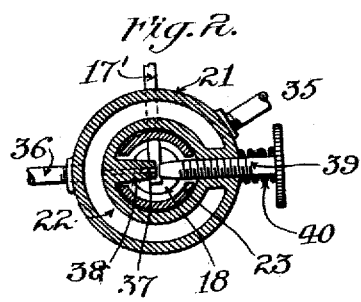
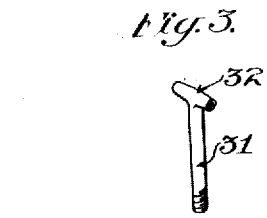
Witnesses:
Frank L. Alpraham
A. P. Knight
Inventor:
Solon Byron Welcome.
by Townsend Bros
his attys.

UNITED STATES PATENT OFFICE.

SOLON BYRON WELCOME, OF LOS ANGELES, CALIFORNIA, ASSIGNOR TO WESTERN IRON WORKS, A CORPORATION OF CALIFORNIA.

INTERNAL-COMBUSTION ENGINE.

No. 822,172.  Specification of Letters Patent.  Patented May 29, 1906.

Application filed April 24, 1905. Serial No. 257,025.

*To all whom it may concern:*

Be it known that I, SOLON BYRON WELCOME, a citizen of the United States, residing at Los Angeles, in the county of Los Angeles, State of California, have invented certain new and useful Improvements in Internal-Combustion Engines, of which the following is a specification.

The main object of this invention is to increase the capacity or the output of internal-combustion engines.

A further object of the invention is to produce a smoother and more efficient operation of such engines.

Another object of the invention is to provide for cooling the internal working parts of the engine.

The invention comprises, in connection with the cylinder and valves of an internal-combustion engine, means for introducing thereinto an intimate mixture of air, fuel, and water.

Water has heretofore been applied to the interior of internal-combustion engines; but the peculiarity of the present invention consists in the fact that the water is applied in such manner that it is intimately mixed with the air and oil to form a substantially uniform mixture constituting the charge for the cylinder. The result of this is that the water-vapor in said mixture retards the explosion or combustion, thereby materially reducing the shock and loss due thereto extending the combustion and consequent expansive effect over a longer range of movement by the piston, thereby enabling the latter to utilize more fully the power due thereto, materially reducing the maximum temperature within the cylinder and largely increasing the amount of fuel that can safely be consumed in a cylinder of given size, thereby greatly increasing the output.

A further object of the invention is to utilize the jacketing-water that is used for cooling the cylinder as a source of supply for forming the mixture above referred to, thereby taking advantage of the heat imparted thereto in the jacketing to aid in the vaporization of the water in the mixture and to prevent undue chilling of the mixture and of the interior of the cylinder.

Another object of the invention is to apply the incoming mixture above described to the exhaust-valve of the engine in such manner that the latter will impart heat to the mixture, thereby aiding in the complete vaporization of the water and oil and preventing overheating of such valve: It will be understood that the exhaust-valve is subject to overheating by the hot exhaust and is more liable to injury than the inlet-valve, and this invention provides for reducing the temperature of the parts so liable to injury by excessive heat.

The accompanying drawings illustrate the invention.

Figure 1 is a vertical section through the engine-cylinder and valve and mixing devices. Fig. 2 is a horizontal section on the line $X^2 X^2$ in Fig. 1. Fig. 3 is a detail perspective of the nozzle-piece for the water-outlet.

1 designates the cylinder of the internal-combustion engine, which is provided with a jacket 2, inclosing a space or passage 3 for the cooling-water supplied thereto by a pipe 4. The valve and mixing devices are shown as arranged in and on a jacket or casing 5, attached to the side of the cylinder, having a transverse passage 6 communicating with a combined inlet and exhaust passage 7, extending through the wall of the cylinder to the interior or combustion chamber thereof. Said case 5 has an internal chamber or tubular portion 8, the space 9 between the parts 5 and 8 constituting a water-jacket chamber for the valve. The stem 10 of the exhaust-valve 11 slides in a vertical bearing 12 in the inner tubular member 8, said bearing being continued downwardly to join the bottom of the outer or jacket casing 5 and is extended at its lower end beyond said casing to engage with or coöperate with any suitable valve-operating means (not shown) to open the valve.

13 designates a spring for holding the exhaust-valve closed.

The exhaust-chamber 14 within the tubular member 8 is provided with a lateral exhaust-outlet 15 and communicates at its top into the passage 6, such communication being controlled by the valve 11, coöperating with a seat 16.

Inlet-valve 17 controls a passage 18, opening into the top of passage 6 above the exhaust-valve, said passage extending vertically through a fitting 19, secured at the top of casing 5 and formed with an internal chamber 20, constituting a water-supply chamber. At the top of fitting 19 is secured a fitting 21, formed with a chamber 22, constituting an oil-supply chamber. The air-inlet pipe 23 leads into the top of fitting 21, the air-inlet passage 18 extending continuously through said pipe and the fittings 21 and 19 to the passage 6. Stem 24 of valve 17 works in a guide 25 and is acted on by a spring 26 to hold the said valve closed against its seat 27, said valve being opened by mechanical means, (indicated at 17'.)

A duct 28 leads from the cylinder water-jacket chamber 3 to the water-chamber 20, a valve 29 controlling the connection from said duct to said chamber 20. A duct 30 leads from the bottom of chamber 20 downwardly into fitting 19, and a nozzle-tube 31 extends obliquely upward from duct 30 and opens at its upper end into air-inlet 18 above the inlet-valve. Said nozzle preferably has a T-head 32 to give a divided or double outlet, spraying the liquid each way, so as to spread the vapor or spray over a large part of the whole area. A valve 33 controls the passage of water through the duct 30. Valves 29 and 33 are screw-valves, coöperating with conical seats in the ends of the ducts and may be provided with springs 34 to hold them in set position. An overflow-pipe 30' leads from chamber 20, so that the water therein is maintained at definite level.

Oil-supply pipe 35 leads into chamber 22, and an overflow-pipe 36 leads from said chamber to maintain the oil therein at definite level. A duct 37 leads diagonally upward from chamber 22 through a projection 38 from fitting 21, terminating at the axis of air-inlet 18, and a screw 39, working in the side of fitting 21, acts to close or obstruct the outlet of said duct and also acts as a deflector to spray the oil as it issues. Valve-screw 39 may have a spring 40 to hold it in set position. The oil and water outlets both extend or project into the air-inlet, so as to allow the fluid to drop freely toward the valve at the bottom of said inlet.

The outlets of the oil and water ducts are somewhat above the level of the oil and water in the respective supply-chambers, so as to require suction for issuance of fluid therefrom.

41 42 represent the sparking-electrodes, mounted in the usual manner in a plug 43 at the outer end of the passage 6.

The operation is as follows: Valve-screw 39 is set to supply the proper quantity of oil at each suction. Valve 33 is set to supply the proper quantity of water at each suction, and valve 29 is set to supply enough water to chamber 20 to keep the chamber full up to the level of overflow, any excess passing off at the latter. At each additional stroke the air is drawn in at inlet 18, valve 17 being operated by the device 17', and as the air-current passes the oil-supply outlet at 37 it draws oil therefrom, this oil being sprayed and mixed with the incoming air. Passing on down, the air passes the water-outlet at 32 and draws a spray of water therefrom. The sprayed oil and water pass on downwardly along with the air through the air-inlet passage 18 and past the valve 17 into the passage 6. In this operation the oil and water are more or less vaporized, it being understood that all the parts in and surrounding the inlet-passage will be warmed by conduction from the engine. The passage 7 and the exhaust-valve 12 are, however, kept at a comparatively high temperature by the exhaust-gases passing the same, and the water and oil spray after passing the inlet-valve is directed downwardly against and on to the exhaust-valve and adjacent parts, thereby completing the vaporization of any unvaporized oil or water. The mixture thereby produced enters the combustion-chamber of the engine in a state of substantial uniformity throughout, being practically a mixed gas comprising air, hydrocarbon vapor, and water-vapor, and the effects of this gas as regards combustion, pressure, and heat absorption will be substantially uniform throughout the combustion-chamber. The most important of these effects as compared with the ordinary mixture is that the presence of water-vapor in the mixture tends to prolong or retard the combustion, thereby lengthening the period of effective pressure. While the maximum pressure may be thereby somewhat reduced, the average effective pressure is greatly increased, and, moreover, the pressure is exerted at a much more favorable time than with a substantially instantaneous combustion or explosion. The explosion customarily takes place at about the dead-point, at which time the mechanism is not in condition to render the force available. It is not until the piston is moved a little from the dead-point that the pressure becomes available in the production of power, and by this time, with the usual explosion or instantaneous combustion, the maximum of pressure will have passed, a large part of the energy having been lost by conduction or absorption of the heat by the cylinder-walls and by transmission of the force to the metallic parts in the form of useless vibrations due to the detonation; but by prolonging or retarding the combustion until the piston passes appreciably from the dead-point the power is developed at a time when the piston can take advantage of it, and greater effective power may be produced without the production of such high temperatures or pressures. For this reason with the above-described apparatus it is possible to supply fuel to the engine in much greater quantity than would be safe with the ordinary system of combustion or explosion. Thus a quantity of oil or fuel that would with an instantaneous-explosion engine produce injurious heating and also imperfect combustion in the explosion can with the above-described construction be safely supplied to the engine and consumed during the longer interval of combustion without danger of overheating or imperfect combustion. A further advantage of the use of water-vapor intimately mixed with the charge in the above-described manner is that, owing to the great heat-absorptive capacity of the water and of its vapor, the interior of the engine is kept comparatively cool, and the heat thus taken or withheld from the cylinder-walls is used to advantage in increasing the elastic pressure of the mixture during the combustion and explosion. This same feature applies with special force to the exhaust-valve and its adjacent parts for the reason above set forth. A further advantage is the superior packing effect for the piston.

What I claim is—

1. In an internal-combustion engine the combination with the cylinder provided with an air-inlet extending upwardly therefrom and open at its upper end, an oil-supply connection having an outlet opening into said air-inlet and a water-supply connection having an outlet opening into the air-inlet, between the oil-outlet and the cylinder.

2. In an internal-combustion engine the combination with the cylinder provided with an air-inlet, an oil-supply connection having an outlet opening into said air-inlet, and a water-supply connection having an outlet opening into the air-inlet, between the oil-outlet and the cylinder; said water-outlet being divided to distribute the issuing water.

3. In an internal-combustion engine the combination with the cylinder provided with an air-inlet, an oil-supply connection having an outlet opening into said air-inlet, and a water-supply connection having an outlet opening into the air-inlet, between the oil-outlet and the cylinder, a water-supply chamber connected to the water-outlet, and means for maintaining the water in said chamber at a level below the water-outlet.

4. In combination with the cylinder of an internal-combustion engine formed with a combined inlet and exhaust passage leading through the wall thereof, a casing attached to the cylinder and having a passage communicating with the said cylinder-passage, said chamber being formed with an exhaust-outlet leading from the passage therein, an annular water-chamber above said casing and secured thereto and having an air-passage formed therein, said annular water-chamber communicating with said air-passage, an annular oil-chamber above and secured to the water-chamber and having an air-passage therethrough, the said water-chamber communicating with said air-passage, the said air-passages in said chambers forming an air-inlet leading to the passage in said casing, and valves controlling said air-inlet and the exhaust-outlet.

5. In combination with an internal-combustion-engine cylinder having a water-jacket and provided with a combined inlet and exhaust passage leading through the wall of the cylinder, a casing attached to the cylinder and having a passage communicating with the said cylinder-passage and provided with an exhaust-outlet, an annular water-chamber above and secured thereto, and having an air-passage therethrough communicating into the said casing-passage, said annular water-chamber communicating with the water-jacket of the cylinder and with the said air-passage within said water-chamber, an oil-chamber above and secured to the water-chamber, the central opening of said annular water-chamber forming an air-passage communicating through the central opening of the water-chamber with the casing-passage, and said oil-chamber communicating with said air-passage within the same, and valves controlling the air-inlet and exhaust-outlet.

6. The combination with an internal-combustion-engine cylinder having a water-jacket and a passage leading through the wall of the cylinder and water-jacket, a casing attached to the cylinder and having a passage communicating with the cylinder-passage and provided with an exhaust-outlet, an annular fitting above and secured to said casing and formed with an annular water-chamber and with a supply-duct leading thereto from the water-jacket, and an overflow leading therefrom, a water-outlet communicating with said water-chamber and with the space within the annular water-chamber, valves controlling said water-supply duct and the said water-outlet, an annular fitting above and secured to the aforesaid fitting, and having an annular oil-chamber and an oil-outlet opening into the space within the annular fitting, and a valve device controlling said oil-outlet and overflow means for said oil-chamber, the space within the said fittings forming an air-inlet communicating with the casing-passage, and valves controlling the air-inlet and exhaust-outlet.

In testimony whereof I have hereunto set my hand, at Los Angeles, California, this 8th day of April, 1905.

SOLON BYRON WELCOME.

In presence of—
GEORGE T. HACKLEY,
ARTHUR P. KNIGHT.